US012049061B2

(12) United States Patent
Stawski

(10) Patent No.: US 12,049,061 B2
(45) Date of Patent: Jul. 30, 2024

(54) COMPOSITE FAILSAFE TORQUE TUBE

(71) Applicant: The Boeing Company, Chicago, IL (US)

(72) Inventor: Stanley W. Stawski, Camano Island, WA (US)

(73) Assignee: THE BOEING COMPANY, Arlington, VA (US)

( * ) Notice: Subject to any disclaimer, the term of this patent is extended or adjusted under 35 U.S.C. 154(b) by 1147 days.

(21) Appl. No.: 16/845,133

(22) Filed: Apr. 10, 2020

(65) Prior Publication Data
US 2020/0238661 A1 Jul. 30, 2020

Related U.S. Application Data

(62) Division of application No. 14/883,672, filed on Oct. 15, 2015, now abandoned.

(51) Int. Cl.
| | |
|---|---|
| *B29D 99/00* | (2010.01) |
| *B29C 35/02* | (2006.01) |
| *B29C 39/14* | (2006.01) |
| *B29C 63/00* | (2006.01) |
| *B32B 1/08* | (2006.01) |
| *B32B 3/06* | (2006.01) |
| *B32B 5/02* | (2006.01) |
| *B32B 5/26* | (2006.01) |
| *B32B 7/04* | (2019.01) |

(Continued)

(52) U.S. Cl.
CPC ............ *B32B 15/092* (2013.01); *B29C 35/02* (2013.01); *B29C 39/14* (2013.01); *B29C 63/00* (2013.01); *B29D 99/0025* (2013.01); *B32B 1/08* (2013.01); *B32B 3/06* (2013.01); *B32B 5/02* (2013.01); *B32B 5/26* (2013.01); *B32B 7/04* (2013.01); *B32B 15/14* (2013.01); *B64C 3/20* (2013.01); *B64C 9/00* (2013.01); *B64F 5/10* (2017.01); *B29C 35/0227* (2013.01); *B29C 70/028* (2013.01); *B29D 99/0028* (2013.01); *B32B 2260/023* (2013.01); *B32B 2260/046* (2013.01); *B32B 2262/106* (2013.01); *B32B 2307/50* (2013.01); *B32B 2307/538* (2013.01); *B32B 2603/00* (2013.01); *B32B 2605/08* (2013.01); *B32B 2605/18* (2013.01); *Y02T 50/40* (2013.01)

(58) Field of Classification Search
CPC ......... B29D 99/0025; B64F 5/10; B64C 3/20; B29C 70/44; B29C 70/544; B29C 44/184
See application file for complete search history.

(56) References Cited

U.S. PATENT DOCUMENTS 2,037,626 A 4/1936 Hall
2,749,061 A 6/1956 Franz
(Continued)

FOREIGN PATENT DOCUMENTS

GB 366784 A 2/1932

*Primary Examiner* — S. Behrooz Ghorishi
*Assistant Examiner* — Alexander A Wang
(74) *Attorney, Agent, or Firm* — MH2 Technology Law Group LLP

(57) ABSTRACT

A method for forming a composite article includes adding an upper skin at least partially over a failsafe torque tube. The failsafe torque tube includes an inner tube and an outer tube. The method also includes adding a lower skin at least partially under the failsafe torque tube. The upper skin, the lower skin, and the outer tube are made of a composite material. The method also includes co-curing the upper skin, the lower skin, and the outer tube together to produce the composite article.

10 Claims, 13 Drawing Sheets

(51) Int. Cl.
  *B32B 15/092* (2006.01)
  *B32B 15/14* (2006.01)
  *B64C 3/20* (2006.01)
  *B64C 9/00* (2006.01)
  *B64F 5/10* (2017.01)
  *B29C 70/02* (2006.01)

(56) References Cited

U.S. PATENT DOCUMENTS

| | | | |
|---|---|---|---|
| 2,932,473 A | 4/1960 | Kass et al. |
| 3,643,522 A | 2/1972 | Fullam |
| 3,706,432 A | 12/1972 | Accashian |
| 3,883,093 A | 5/1975 | Molleau |
| 4,214,932 A | 7/1980 | Van Auken |
| 4,330,100 A | 5/1982 | Elber |
| 4,616,977 A | 10/1986 | Schramm |
| 4,622,022 A | 11/1986 | Diffenderfer et al. |
| 4,622,840 A | 11/1986 | Diffenderfer et al. |
| 4,779,822 A | 10/1988 | Burandt et al. |
| 4,789,594 A | 12/1988 | Stawski |
| 6,089,503 A | 7/2000 | Volk |
| 6,375,127 B1 | 4/2002 | Appa |
| 6,863,245 B2 | 3/2005 | Gessler et al. |
| 7,131,611 B2 | 11/2006 | Ferman |
| 7,419,435 B2 | 9/2008 | Borges et al. |
| 8,038,093 B2 | 10/2011 | Llamas Sandin et al. |
| 8,430,759 B2 | 4/2013 | Wanthal |
| 9,315,256 B2 | 4/2016 | Maenz |
| 2003/0206802 A1 | 11/2003 | Gmirya |
| 2004/0004163 A1 | 1/2004 | Davies et al. |
| 2004/0082394 A1 | 4/2004 | Lee et al. |
| 2006/0022085 A1 | 2/2006 | Ferman |
| 2007/0137971 A1 | 6/2007 | Halsey |
| 2009/0111689 A1 | 5/2009 | Wanthal |
| 2009/0267339 A1 | 10/2009 | Usoro et al. |
| 2010/0019083 A1 | 1/2010 | Llamas Sandin et al. |
| 2011/0127705 A1 | 6/2011 | Whitaker et al. |
| 2013/0300043 A1 | 11/2013 | Whitaker et al. |
| 2014/0117593 A1 | 5/2014 | Lyons et al. |
| 2014/0341641 A1 | 11/2014 | Stawski |
| 2015/0137430 A1 | 5/2015 | Lyons et al. |
| 2016/0311518 A1 | 10/2016 | Wiebe |

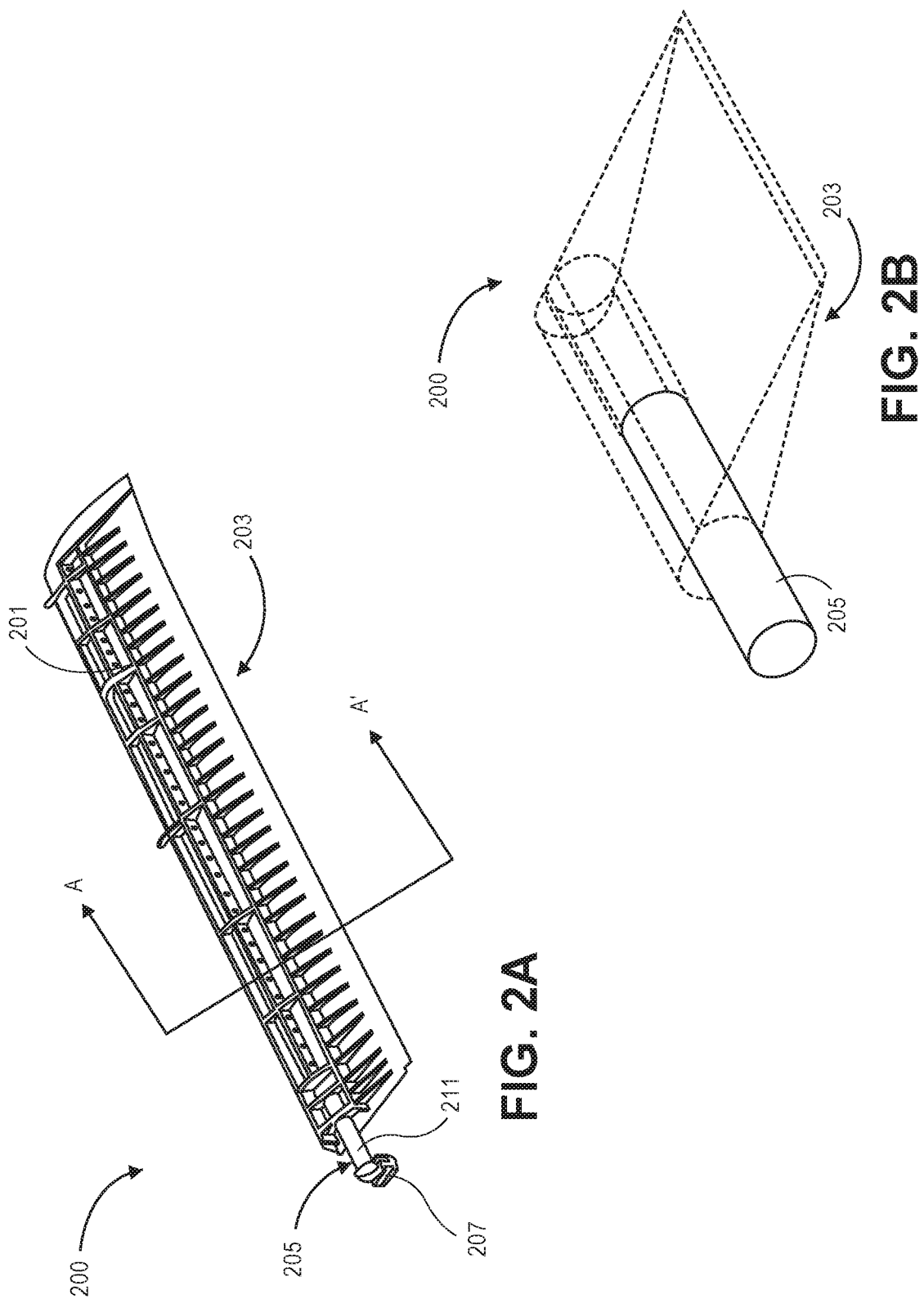

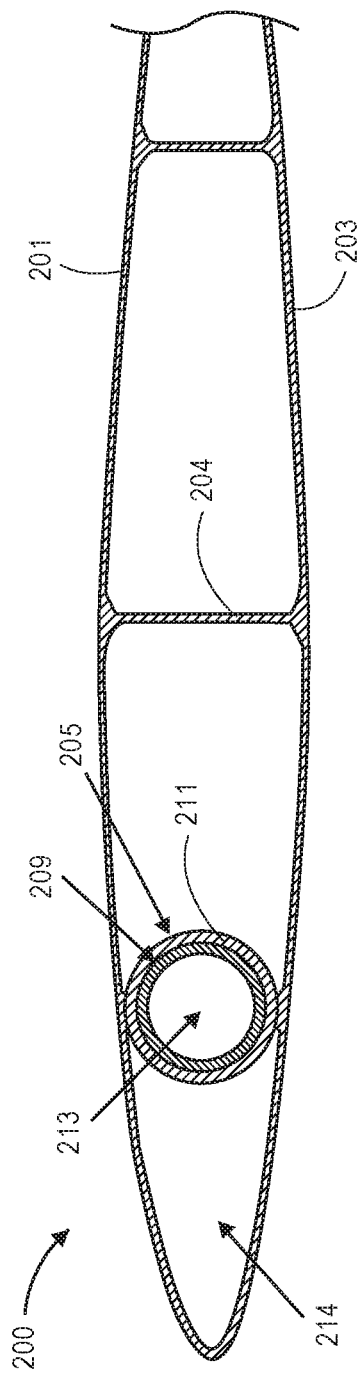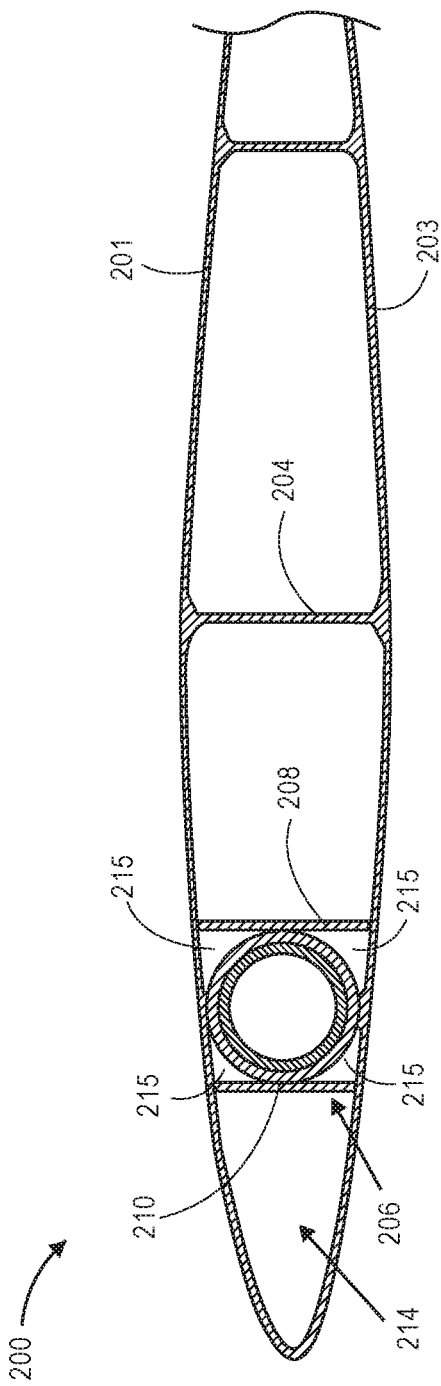

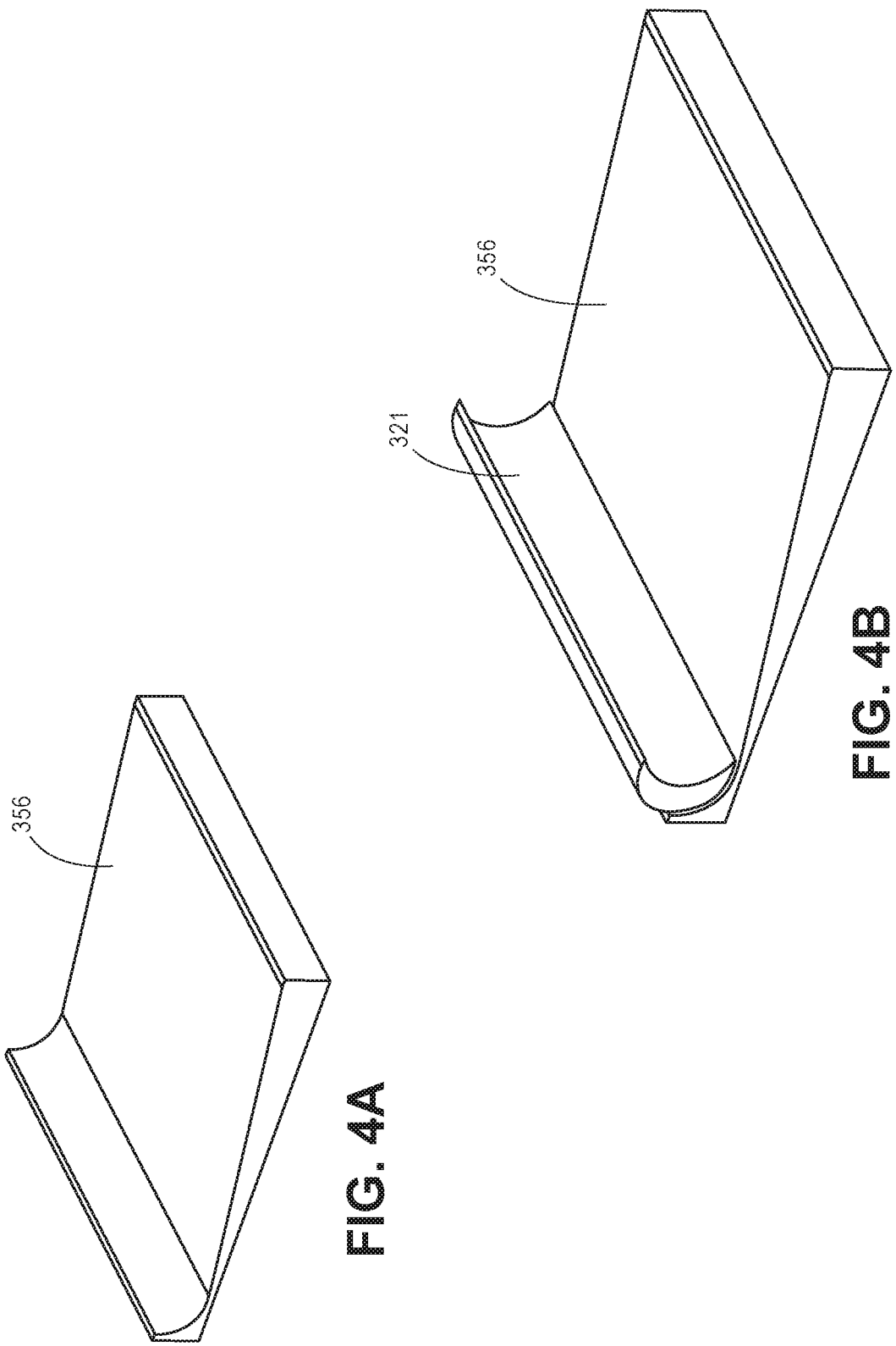

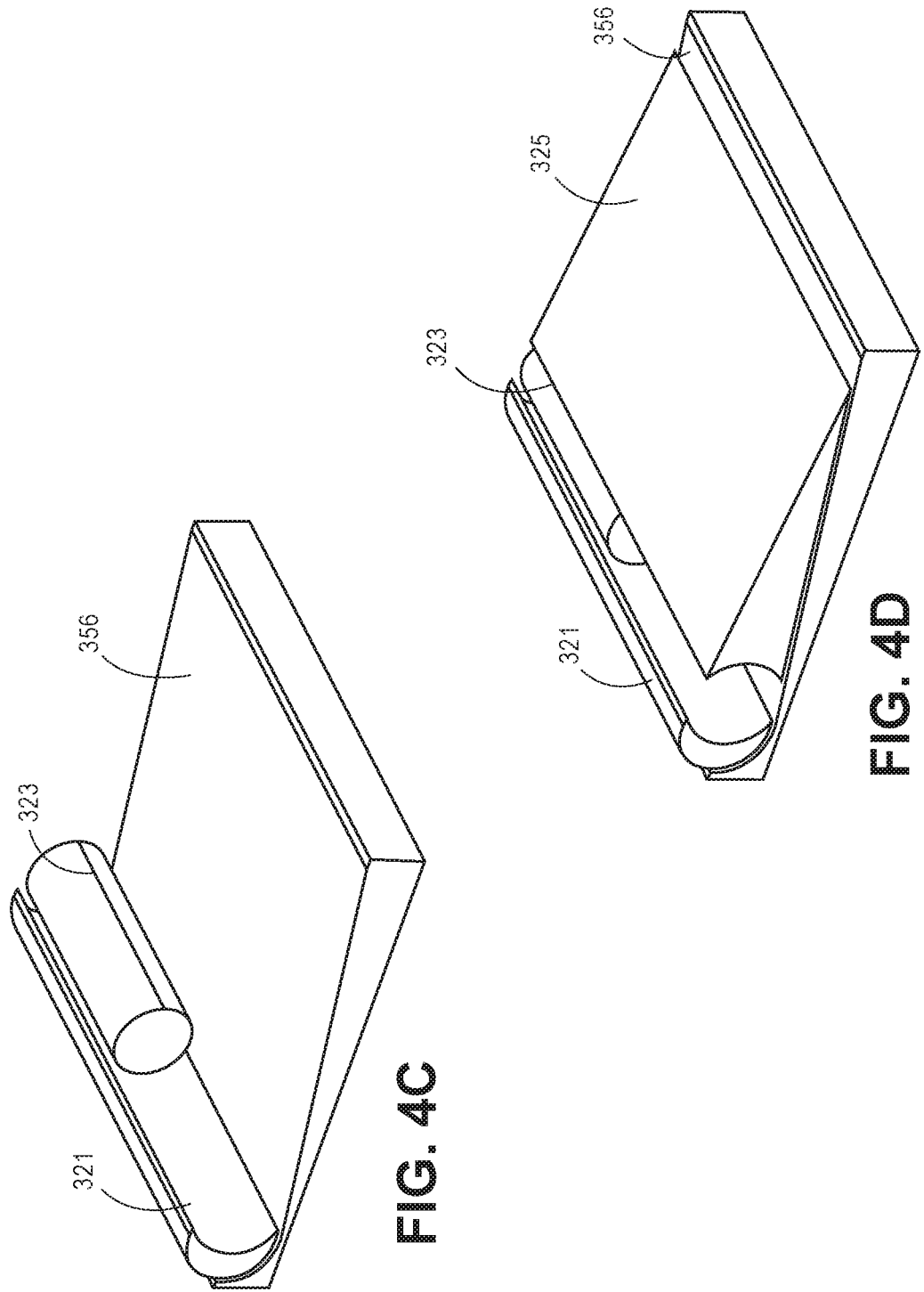

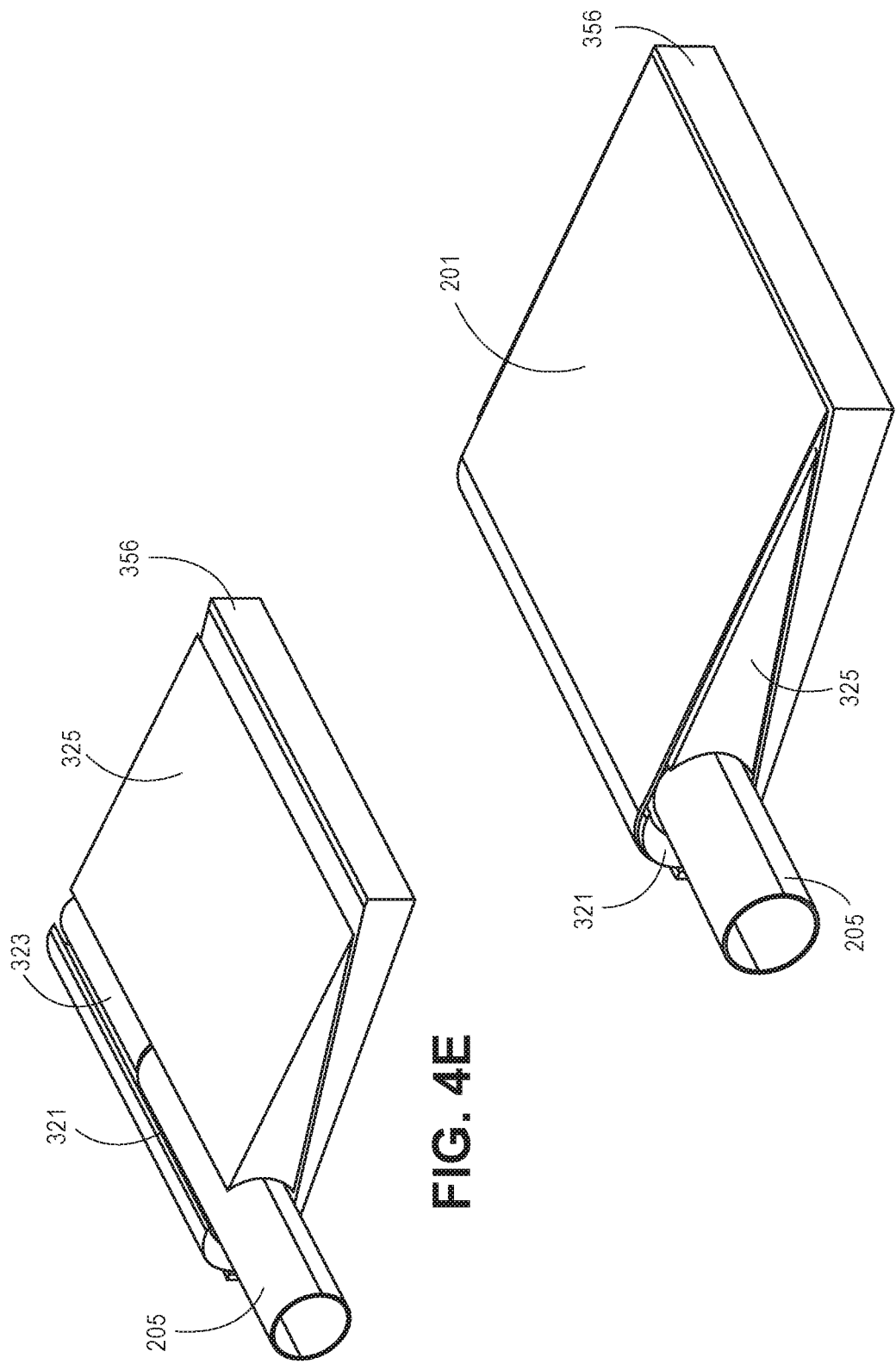

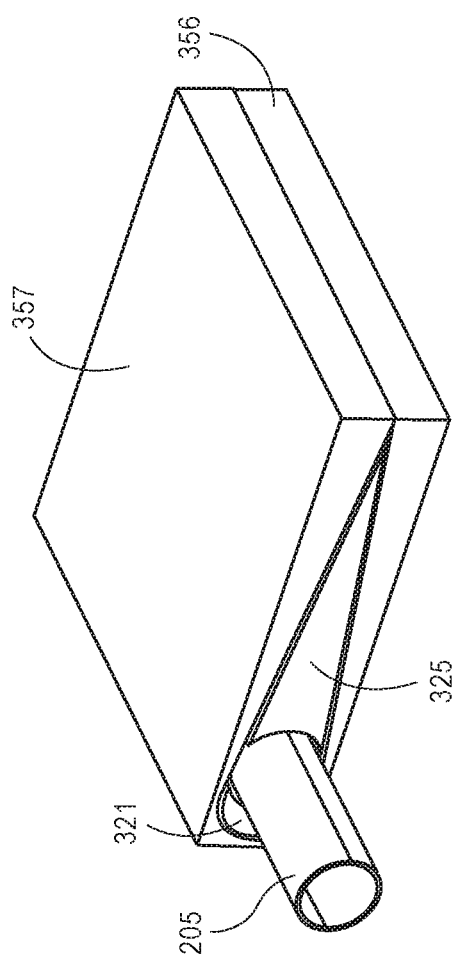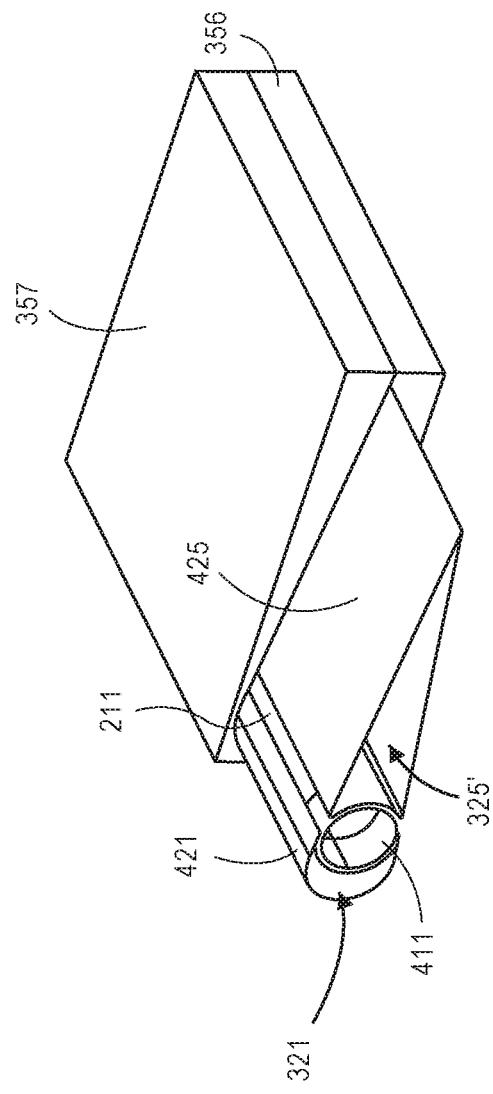

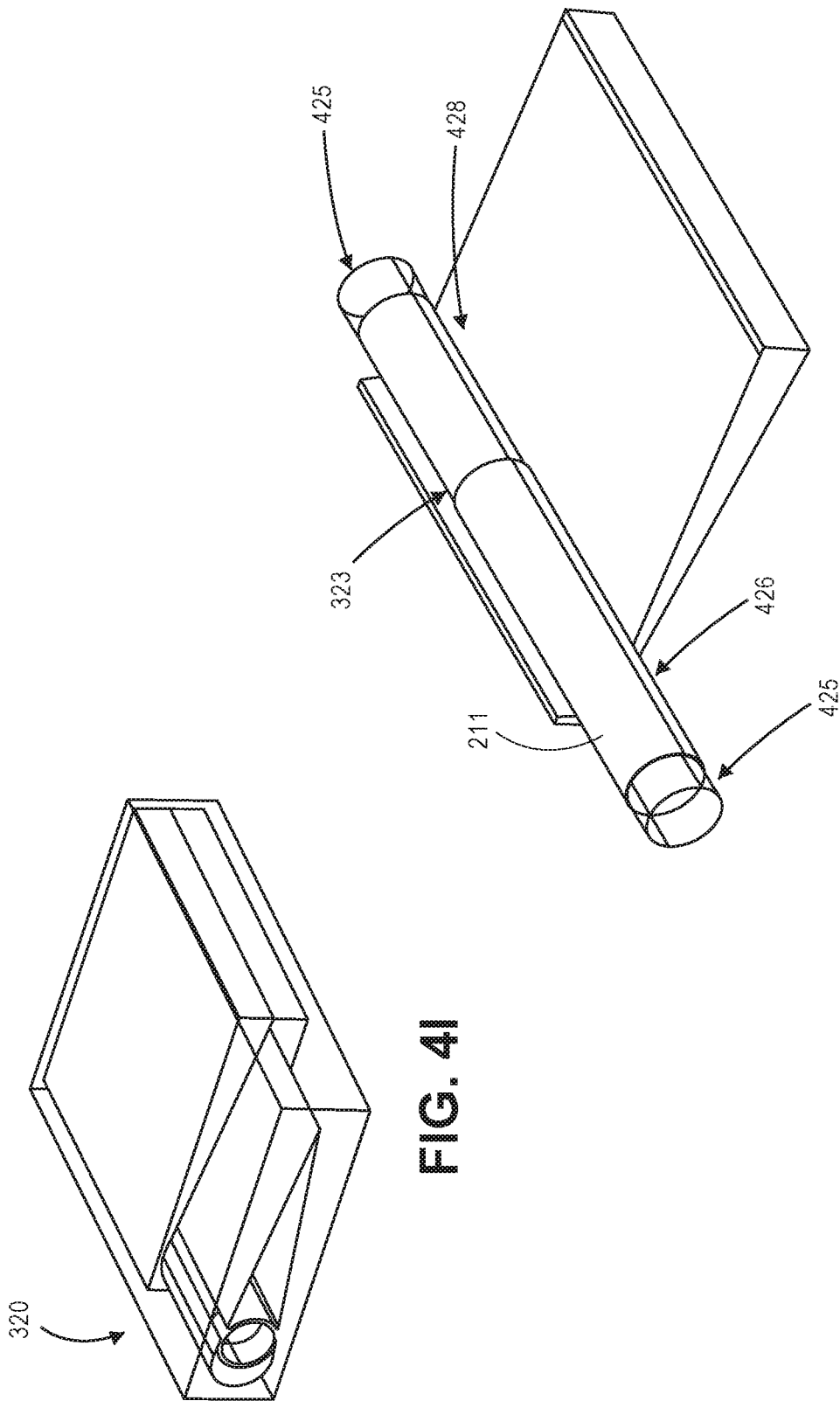

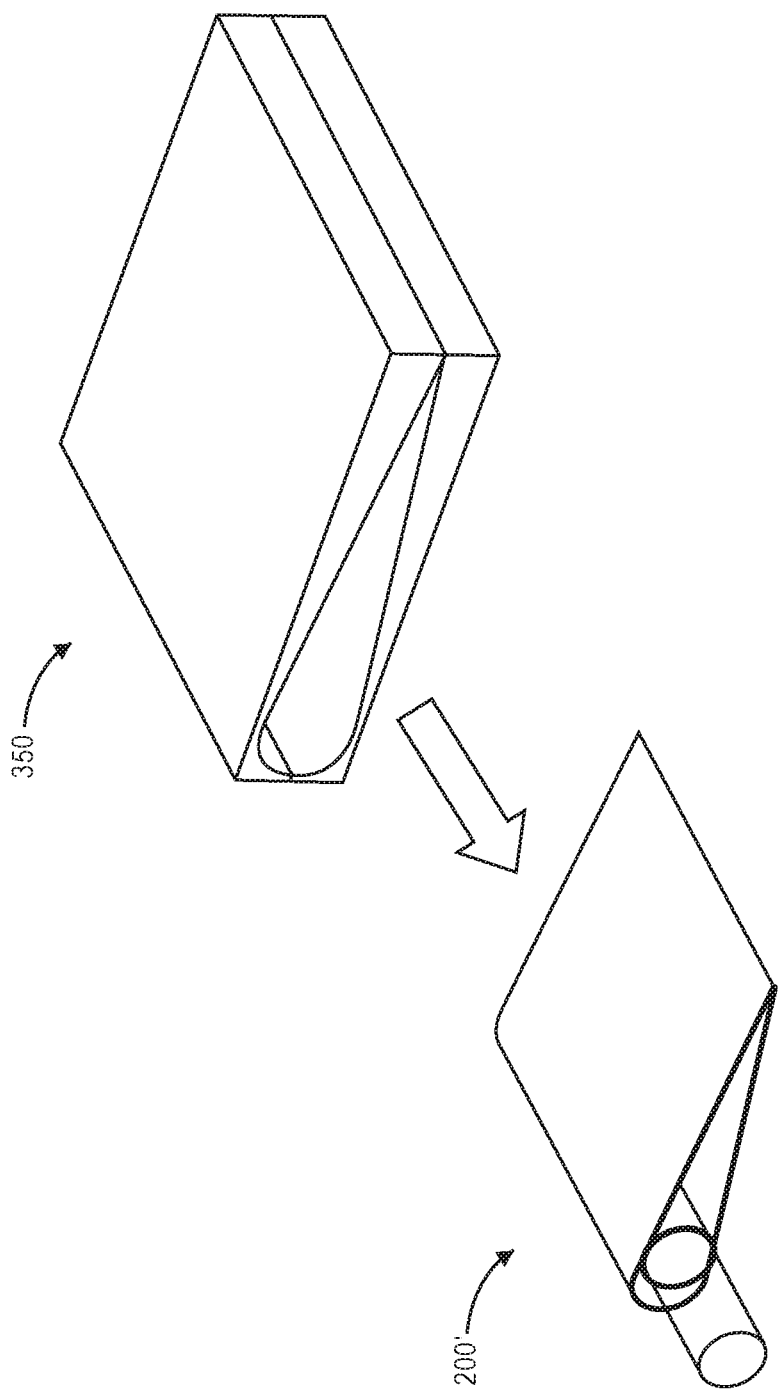

COMPOSITE FAILSAFE TORQUE TUBE

CROSS-REFERENCE TO RELATED APPLICATIONS

This application is a divisional of U.S. patent application Ser. No. 14/883,672, filed on Oct. 15, 2015, the entirety of which is incorporated by reference herein.

TECHNICAL FIELD

The subject matter described herein relates generally to composites manufacturing and, more particularly, to the manufacturing of composite articles having integrated failsafe components, such as a composite air vehicle control surface having an integrated composite failsafe torque tube, and including methods for forming a composite failsafe torque tube in a composite article.

BACKGROUND

Composite structures are used in a wide variety of applications. In aircraft construction, composites are used in increasing quantities to form the fuselage, wings, and other components of the aircraft. The wings of an aircraft are generally hollow structures that may require a smooth and dimensionally-accurate outer mold line (OML) surface. The wings and wing components such as flaps may be constructed of composite skin members and may include internal structural components such as ribs, spars, and/or stiffeners to increase the strength and bending stiffness of the wings.

In conventional construction techniques for forming three-dimensional composite structures such as an aircraft wing or wing components, cured composite components such as wing spars may be assembled to composite skin members by mechanical fastening. The process of assembling the composite components may require the use of a large quantity of mechanical fasteners and specialized tooling for maintaining the relative positions of the composite components. Unfortunately, the process of forming cured composite components in a separate step and then later assembling such components using mechanical fasteners is a time-consuming and labor-intensive process. In addition, the mechanical fasteners may increase the overall weight of the composite structure. Furthermore, mechanical fasteners that are installed in OML surfaces may disrupt the aerodynamics of the composite structure.

A composite structure may also be formed by fitting together uncured composite components using a tool. Conventional processes for forming hollow composite structures also include the use of internal tooling. For composite structures having hollow, non-draftable geometry, the internal tooling must be removable from the interior of the composite part after curing. An inflatable mandrel may be installed within a hollow composite layup that may be positioned within a closed female mold. The inflatable mandrel may be inflated to apply an internal compaction pressure on the composite layup against the female mold to consolidate the composite layup. Heat may be applied to cure the composite layup. After curing of the composite layup, the mandrel may be deflated and removed from the cured composite structure. One such example is the system and method described in U.S. Patent Application Publication No. 2015/0137430 published on May 21, 2015, the contents of which are incorporated by reference herein in its entirety.

Composite structures made from fibrous materials and various resins are finding increased use as substitutes for metal in aircraft and other structures. However, fabrication of composite items is relatively more complicated than metal fabrication. Generally, composite items are built up, layer upon layer on a mold or the fiber component is placed and then impregnated with resin. Afterward, the item is cured and removed from the mold. While some shapes are relatively easy to generate in this manner, others are not. In addition, while composites are quite strong, they are generally not as tough as metals. Thus, some components such as air vehicle control surface structures which can include flaps, rudders, elevators, ailerons and the like, and which are made to include expensive failsafe torque tubes, are rarely assembled from co-cured components due to the difficulty to assemble the torque tubes in a co-cured part.

Accordingly, it is desirable to develop a three-dimensional composite structure having a hybrid composite item that includes dissimilar materials and methods for fabricating such three-dimensional composite structure.

SUMMARY

A method for forming a composite article is disclosed. The method includes adding an upper skin at least partially over a failsafe torque tube. The failsafe torque tube includes an inner tube and an outer tube. The method also includes adding a lower skin at least partially under the failsafe torque tube. The upper skin, the lower skin, and the outer tube are made of a composite material. The method also includes co-curing the upper skin, the lower skin, and the outer tube together to produce the composite article.

A method for forming an integral, monolithic, composite article is disclosed. The method includes positioning an upper skin at least partially over a failsafe torque tube. The failsafe torque tube includes an inner tube and an outer tube. The method also includes positioning a lower skin at least partially under the failsafe torque tube. The failsafe torque tube is positioned between and in contact with the upper skin and the lower skin. The upper skin, the lower skin, and the outer tube are made of a composite material. The method also includes co-curing the upper skin, the lower skin, and the outer tube together to produce the integral, monolithic, composite article. The inner tube serves as a mold for the outer tube during the co-curing. The inner tube remains positioned within the outer tube after the co-curing and during use of the integral, monolithic, composite article.

A method for forming a composite air vehicle control surface is also disclosed. The method includes positioning a forward bag carrier on a lower mold. The method also includes positioning a mid bag carrier on the lower mold. The method also includes positioning an aft bag carrier on the lower mold. The mid bag carrier is positioned at least partially between the forward bag carrier and the aft bag carrier. The method also includes positioning a failsafe torque tube on the lower mold. The failsafe torque tube is positioned at least partially between the forward bag carrier and the aft bag carrier. The failsafe torque tube includes an inner tube and an outer tube. The method also includes adding an upper skin at least partially over the mid bag carrier, the aft bag carrier, and the failsafe torque tube. The method also includes adding a lower skin at least partially under the mid bag carrier, the aft bag carrier, and the failsafe torque tube. The outer tube, the upper skin, and the lower skin are made of a composite material. The method also includes positioning an upper mold at least partially over the composite upper skin. The method also includes positioning a forward bag at least partially around the forward bag carrier. The method also includes positioning an aft bag at least partially around the aft bag carrier. The method also includes co-curing the outer tube, the upper skin, and the lower skin together to produce the composite air vehicle control surface. The lower mold at least partially defines a surface of the lower skin, and the upper mold at least partially defines a surface of the upper skin.

Advantages of the examples will be set forth in part in the description which follows, and in part will be understood from the description, or may be learned by practice of the examples. The advantages will be realized and attained by means of the elements and combinations particularly pointed out in the appended claims.

It is to be understood that both the foregoing general description and the following detailed description are exemplary and explanatory only and are not restrictive of the examples, as claimed.

BRIEF DESCRIPTION OF THE DRAWINGS

The accompanying drawings, which are incorporated in and constitute a part of this specification, illustrate examples of the present teachings and together with the description, serve to explain the principles of the disclosure.

FIG. 2A is a schematic illustration of a composite article that includes a composite failsafe torque tube.

FIG. 2B is a hidden line view of the composite article showing some internal structure of the composite article of FIG. 2A.

FIG. 2C is a cross-sectional view of the composite article of FIG. 2A along cut line A-A' showing internal composite structural support components.

FIG. 2D shows a cross-sectional view of an alternative configuration for the composite article of FIG. 2A along cut-line A-A'.

FIGS. 4A-4K illustrate operations of a manufacturing method, such as a co-cured bagging process, for making the composite article of FIG. 2A

DESCRIPTION OF THE EXAMPLES

Figure 1A:
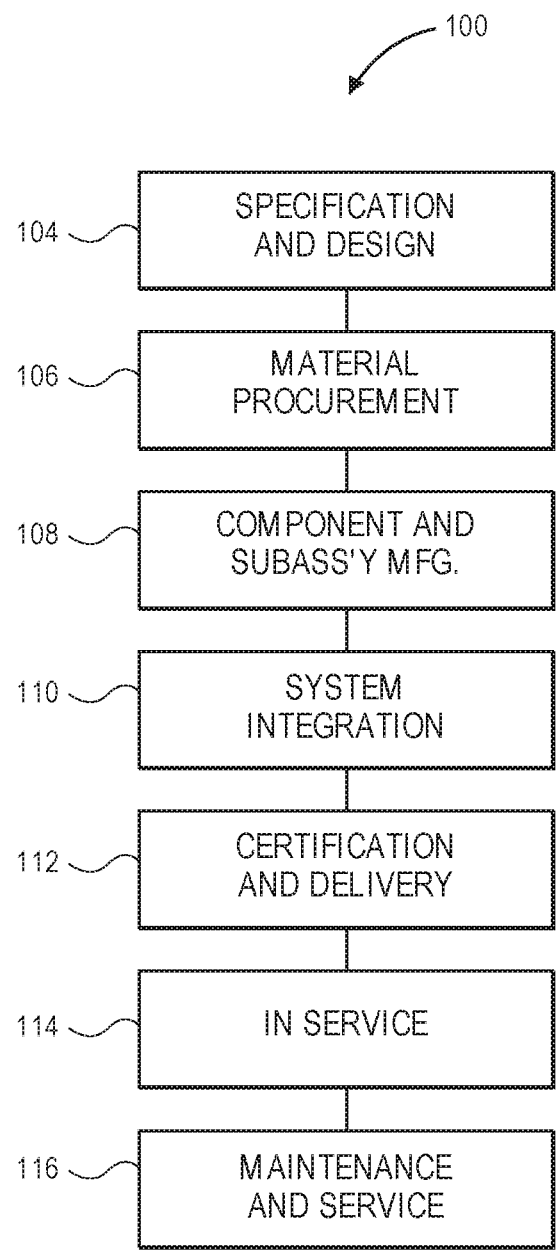
FIG. 1A is a flow diagram of aircraft production and service methodology, according to an example.

Reference will now be made in detail to the present examples, examples of which are illustrated in the accompanying drawings. Wherever possible, the same reference numbers will be used throughout the drawings to refer to the same or like parts.

Notwithstanding that the numerical ranges and parameters setting forth the broad scope of the examples are approximations, the numerical values set forth in the specific examples are reported as precisely as possible. Any numerical value, however, inherently contains certain errors necessarily resulting from the standard deviation found in their respective testing measurements. Moreover, all ranges disclosed herein are to be understood to encompass any and all sub-ranges subsumed therein. For example, a range of "less than 10" can include any and all sub-ranges between (and including) the minimum value of zero and the maximum value of 10, that is, any and all sub-ranges having a minimum value of equal to or greater than zero and a maximum value of equal to or less than 10, e.g., 1 to 5. In certain cases, the numerical values as stated for the parameter can take on negative values. In this case, the example value of range stated as "less than 10" can assume negative values, e.g. −1, −2, −3, −10, −20, −30, etc.

The following examples are described for illustrative purposes only with reference to the Figures. Those of skill in the art will appreciate that the following description is exemplary in nature, and that various modifications to the parameters set forth herein could be made without departing from the scope of the present examples. It is intended that the specification and examples be considered as exemplary only. The various examples are not necessarily mutually exclusive, as some examples can be combined with one or more other examples to form new examples. It will be understood that the structures depicted in the figures may include additional features not depicted for simplicity, while depicted structures may be removed or modified.

Torque tubes operate similarly to coaxial drive shafts on a car. Failsafe torque tubes include a dual torque tube design. In a failsafe torque tube, if one "shaft" fails, another torque tube is available to take the load. The dual failsafe torque tubes have conventionally included only metallic tubes. Metallic torque tubes are very difficult to incorporate into a composite structure. Air vehicle control surfaces, which may include aerodynamic flaps, rudders, elevators, ailerons and the like, are rarely made from co-cured composites. One of the many reasons for this is due to the difficulty to assemble the all-metal torque tubes into a co-cured part. The examples described herein provide co-cured composite articles, which may be any air vehicle control surface such as co-cured composite aerodynamic flaps, that include composite failsafe torque tubes, and methods of fabricating such co-cured composite articles and composite failsafe torque tubes. Such methods overcome the difficulties of assembling the torque tubes into a co-cured part. For example, the use of composite failsafe torque tubes in a composite part such as a composite flap eliminates expensive machining of dual metallic torque tubes. Additionally, the weight of the failsafe torque tube is reduced. Additional benefits include a reduction in part quantity, manufacturing flow time and fabrication hours.

As described herein, a composite structure may be assembled into a structural component for use in a larger structure such as an aircraft, a space vehicle, or a waterborne vehicle. By way of example, aircraft structures such as wings and tails commonly include structural components formed from composite materials. Thus, examples described herein allow composite structures to be assembled as composite articles that include composite failsafe torque tubes. More specifically, the examples provide methods for making a co-cured composite article, which may be an air vehicle control surface such as a composite flap having a composite failsafe torque tube.

In an example, a composite failsafe torque tube comprises an inner tube, which may be a metallic or a composite tube, and an outer tube, which may be composite tube. The composite failsafe torque tube may have an annular shape, comprising an outer diameter, an inner diameter and a wall thickness. The outer composite tube may have an internal volume in which the inner tube is disposed. The inner tube and the outer tube may extend co-axially. The inner tube may serve as a mold (e.g., for forming the outer tube) during fabrication of an air vehicle control surface such as a flap, and may also be incorporated as a functioning component of the final control surface which may be installed on an air vehicle. In other words, the outer composite tube may be co-cured during fabrication with other composite structural components of the control surface, using the inner tube as part of a mold for forming the control surface (e.g., a mold over which the outer composite tube is formed). After co-curing, where a normal mold would be removed from the cured control surface, the inner tube may remain in the cured control surface as it functions as part of a functional component of the control surface, for example, in a composite failsafe (redundant) torque tube.

The outer composite tube may be formed around the inner tube. In an example, a metallic inner tube may serve both as a mold on which the outer composite tube may be formed and may serve as a bag carrier that can remain in composite article even after fabrication and installation on, for example, an air vehicle. Practice of the subject matter disclosed herein may overcome challenges associated with expensive machining that would otherwise be required for dual metallic torque tubes, may reduce weight of the component, and may reduce manufacturing flow-time and fabrication hours. And, it is noted that exemplary torque tubes may not be limited to metallic-composite hybrid failsafe torque tubes, but may comprise inner and outer torque tubes both formed of composites.

For the purpose of this disclosure, the term, "failsafe" refers to a device, system, and method having a redundant feature. For example, as used herein, the term "failsafe composite torque tube" refers to a torque transmission device with a redundant load path. As such, in the event of a failure in one load path, a second load path is configured to transmit torque.

Figure 1B:
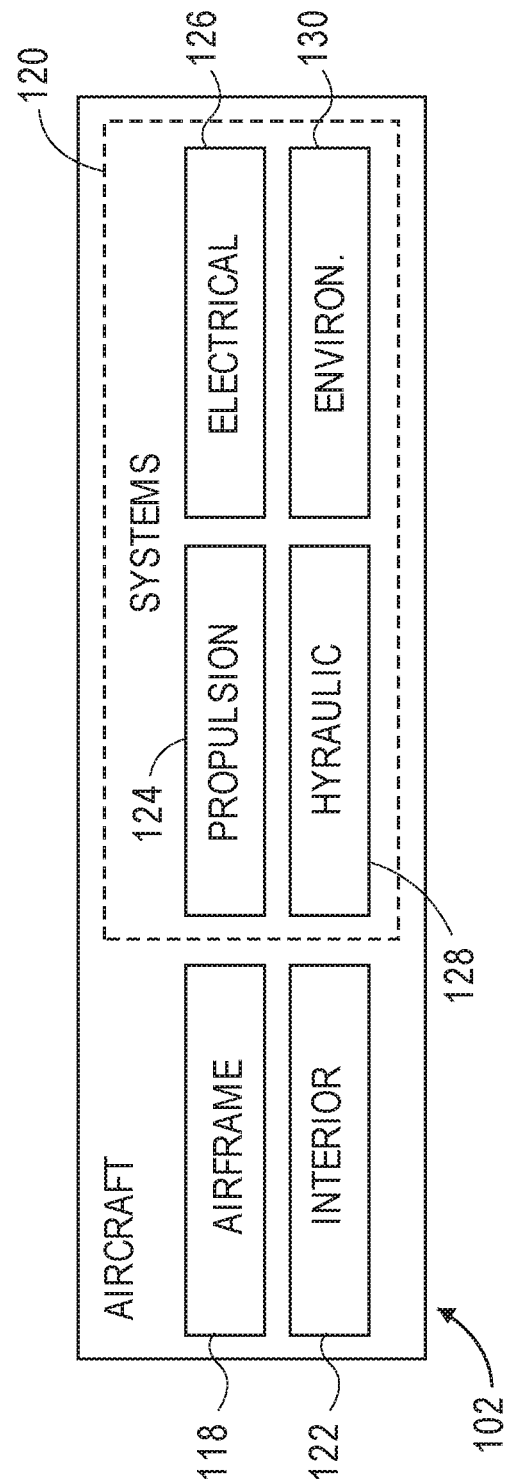
FIG. 1B is a block diagram of an aircraft, according to an example.

Referring more particularly to the drawings, examples of the disclosure may be described in the context of an aircraft manufacturing and service method 100 as shown in FIG. 1A and an aircraft 102 as shown in FIG. 1B. During pre-production, exemplary method 100 may include specification and design 104 of the aircraft 102 and material procurement 106. During production, component and subassembly manufacturing 108 and system integration 110 of the aircraft 102 takes place. Thereafter, the aircraft 102 may go through certification and delivery 112 in order to be placed in service 114. While in service by a customer, the aircraft 102 may be scheduled for routine maintenance and service 116 (which may also include modification, reconfiguration, refurbishment, and so on).

Each of the processes of method 100 may be performed or carried out by a system integrator, a third party, and/or an operator (e.g., a customer). For the purposes of this description, a system integrator may include without limitation any number of aircraft manufacturers and major-system subcontractors; a third party may include without limitation any number of vendors, subcontractors, and suppliers; and an operator may be an airline, leasing company, military entity, service organization, and so on.

As shown in FIG. 1B, the aircraft 102 produced by exemplary method 100 may include an airframe 118 with a plurality of systems 120 and an interior 122. Examples of high-level systems 120 include one or more of a propulsion system 124, an electrical system 126, a hydraulic system 128, and an environmental system 130. Any number of other systems may be included. Although an aerospace example is shown, the principles of the invention may be applied to other industries, such as the automotive industry.

In an aircraft, a torque tube may be utilized to transmit torque from a motor or other such actuator to a control surface actuator. The control surface actuator modulates the attitude of a control surface on the wing, for example, and is therefore of critical importance to the operation of the aircraft. As illustrated in FIG. 2A, a composite article 200, which may be a co-cured component such as a composite flap portion of an airplane wing for an air vehicle, may include an upper skin 201, a lower skin 203, and a failsafe torque tube 205 that is at least partially disposed within the composite flap, such as between the upper skin and the lower skin, for example, in an interior 214 portion. The torque tube 205 may include an inner tube (not visible) and an outer tube. At least a portion of the torque tube 205, for example, at least a portion of the inner tube and the outer tube may be disposed in the composite article 200 (see FIG. 2B). The inner tube 209 may be disposed in the outer tube. The outer tube may be a composite tube formed by co-curing with composite components, such as composite structural components, of the composite article 200. The composite failsafe torque tube 205 may terminate in an end-fitting 207, such as a flange. The end-fitting 207 may provide a durable connection between the torque tube and components attached to the torque tube such as an actuator for rotating the failsafe torque tube 205. One or both of the inner tube and the outer tube of the composite failsafe torque tube 205 may be attached to the end-fitting 207.

As shown in the cross sectional view at FIG. 2C, the composite article 200, which may be the aerodynamic flap of an air vehicle, may include an integrated composite failsafe torque tube. The composite failsafe torque tube 205 may include an inner tube 209 which may be disposed in the outer tube 211, for example, between inner sidewall portions of the outer tube 211, and may comprise a length that extends coaxially with a length of the outer tube 211. The inner tube may be a metallic or composite torque tube. The outer tube may be a composite tube. The inner tube, the outer tube or both the inner and outer tubes may include any suitable material. Examples of suitable materials include fiber reinforced plastics or metal or other structural material. Particularly suitable materials include, for example, carbon fiber reinforced plastic. The plastic matrix includes any suitable polymer such as, for example, epoxy and the like. The outer tube 211 may be a composite tube portion of composite article 200 which may be co-cured between the upper skin 201 and lower skin 203 of composite article 200 along with spars 204 which may be composite spars. In an example, the outer composite tube 211 may comprise a plurality of cured composite plies formed around at least a portion of the inner tube 209.

Composite failsafe torque tube 205 may be connected at an end thereof to an actuator and may be configured to accept a rotational force which it then translates to the composite article 200. In an example, ends of the outer composite tube and the inner tube 209 may be connected to a common end-connector. Thus, at least one of the outer composite tube 211 and the inner tube 209 may be rotatably disposed in the air vehicle flap. In an example, the outer composite tube is non-rotatably disposed in the air vehicle flap. That is, the outer composite tube 211 may be cured, bonded or otherwise connected to other structural components of the article 200. In an example, the structural components of the article and the outer composite tube 211 may be co-cured and may form a single monolithic composite structure. Thus, in example, additional spars may be incorporated in an article 200 to provide better stress distribution and also to prevent the outer tube 211 from rotating or otherwise moving prior to, during, and/or after curing. The failsafe torque tube 205 may, therefore, be disposed between at least two of the plurality of spars such as spars 208 and 210, which may be composite spars, as shown in FIG. 2D. For example, a first spar 208 may abut a side surface of the failsafe torque tube's outer tube 211 and a second spar 210 may another side surface portion of the failsafe torque tube. That is, at least two of the plurality of spars may be configured to physically contact the outer surface 206 of the outer composite tube. Accordingly, the outer tube 211 may be supported by between the upper skin 201 and lower skin 202 as shown in FIG. 2C, and may be further supported by additional spars 208, 210 as shown in FIG. 2D, all or some of which may be co-cured with the outer tube 211. In other words, the additional spars 208, 210 may extend between upper skin 201 and lower skin 203 and may physically touch outer tube 211 and may be co-cured together. As a result, spars 208, 210 further prevent the outer tube 211 from rotating by providing additional contact points on an outer surface of the torque tube. During manufacturing, such as during a curing process, additional bag carriers may be required at spaces 215 between the second composite torque tube and the spars 208 and 210. In an example, composite failsafe torque tube 205 may form a leading edge of a control surface, such as the leading edge of a flap.

Figure 3:
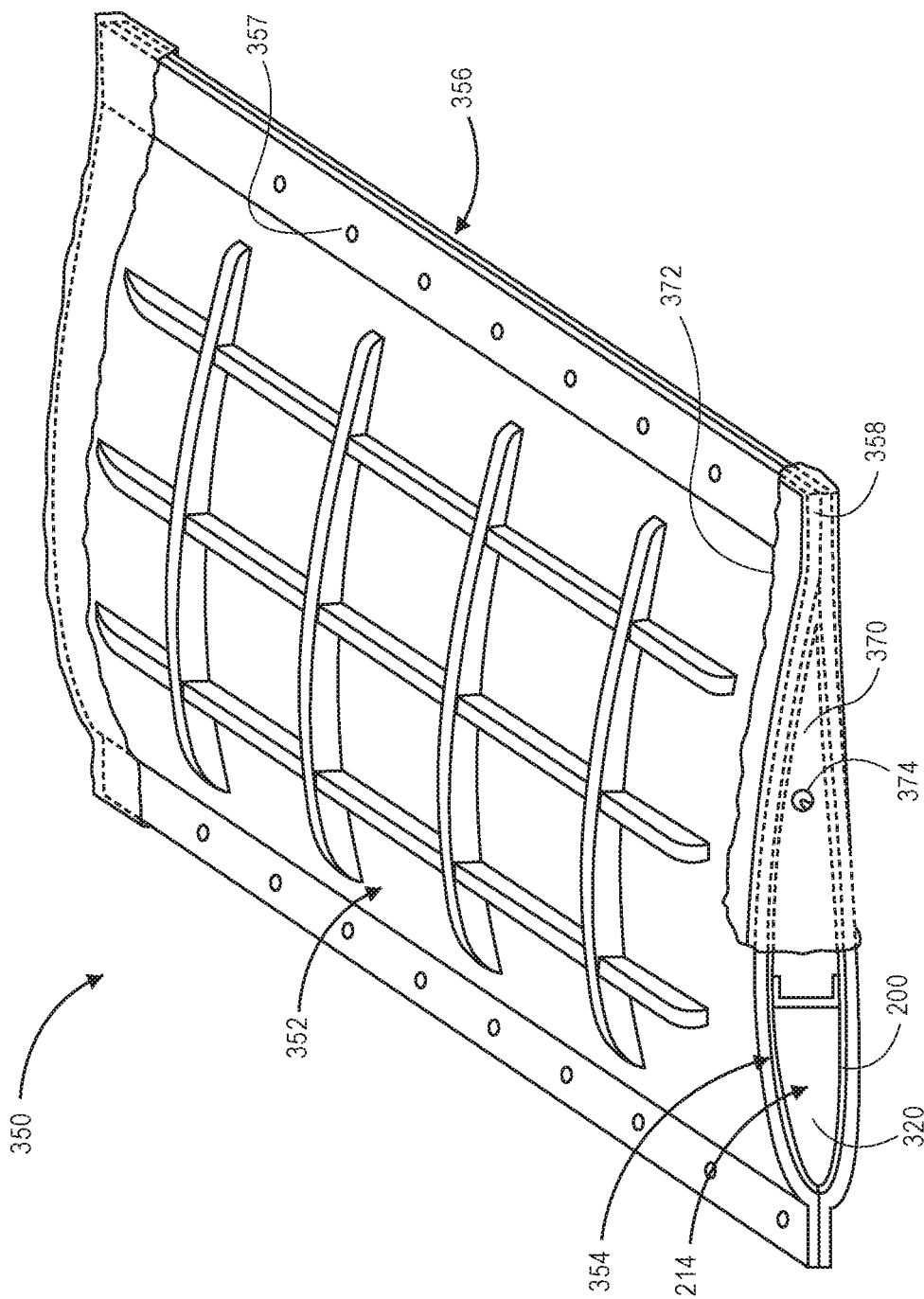
FIG. 3 is a perspective view of an example of a closed mold tooling system having an outer mold line (OML) tool and one or more inner mold line (IML) tools positioned within a hollow part interior of a composite article that may be processed within the OML tool.

Shown in FIG. 3 is a closed mold tooling system 350 as may be implemented for processing a composite article 200 such as in a co-curing process for forming a composite flap having a composite failsafe torque tube for an air-vehicle. The closed mold tooling system 350 may include an outer mold line (OML) tool 352 and one or more inner mold line (IML) tools 320. Each IML tool 320 or bag carrier may include part of an internal vacuum bagging system. In FIG. 3, the OML tool 352 may be comprised of two OML tool halves including an lower mold 356 and an upper mold 357, collectively defining an inner OML tool surface 354. For example, the lower mold 356 may be a a lower airfoil OML layup mold and the upper mold 357 may be an upper airfoil OML layup mold. The OML tool surface 354 may define a surface of the upper skin 201 and lower skin 203 for the composite article 200. The OML tool 352 may encapsulate the composite article 200 and one or more, including all IML tools 320. Each IML tool 320 may comprise part of a vacuum bagging system that may include a bag carrier or a mandrel that may be positioned within interior 214 portion of the composite article 200, for example between the upper skin 201 and the lower skin 203. The OML tool 352 may be formed of Invar or any metallic or non-metallic material including composite material (e.g., carbon fiber) that is compatible with the composite article 200 with regard to the coefficient of thermal expansion of the composite article 200 material. The OML tool upper and lower molds may include tool flanges to facilitate mating of the upper and lower molds along a tool seam using a plurality of mechanical fasteners or other means.

The OML tool 352 may include external ribs or other stiffening members which may extend in various directions along the OML tool 352 and which may provide the OML tool 352 with sufficient stiffness to react internal compaction pressure generated by the internal vacuum bags for consolidating the composite article 200. In addition, the OML tool 352 may also be configured with sufficient stiffness to counteract autoclave pressure under repeated cycles at relatively high processing (e.g., consolidating, curing, molding, glass transition, etc.) temperatures. The OML surface 354 may have a relatively high level of surface finish (e.g., a relatively low level of surface roughness) to provide a smooth surface finish to the composite article 200.

In FIG. 3, the OML tool 352 may include one or more tool ends 358 that may be generally open. External vacuum bags 370 may be sealed over the tool ends 358 using a bag edge sealant such as vacuum bag sealant or a high-temperature vacuum bag sealant tape to sealingly enclose the tool interior. The external vacuum bag 370 may be fluidly coupled to a vacuum source 374 such that a vacuum pressure may be provided to the tool interior to generate internal compaction pressure against an inner surface of the composite article 200. Although not shown, the OML tool 352 may optionally include one or more rigid end caps that may be mounted to one or more of the tool ends 358 for examples wherein each IML tool 320 comprises a vacuum system including an expandable mandrel for generating internal compaction pressure against the part inner surface of the composite article 200. The expandable mandrel may include a foam mandrel covered with a bag (e.g., pleats in a bag). The vacuum system of the examples may be that as described in U.S. Patent Application Publication 2014/01117593, published on May 1, 2014, the entire contents of which are incorporated by reference herein by reference. As used herein, a vacuum bag formed around a mandrel or bag carrier may be referred to as an "IML bag".

The tooling system 350 may facilitate the co-bonding and/or co-curing of the composite upper skin 201 and composite lower skin 203 with one or more composite layups of the internal structural components such as the spars, during the application of heat and internal compaction pressure. Advantageously, a vacuum bagging system and co-curing method disclosed herein provides for the application of substantially uniform internal compaction pressure to the composite article 200 positioned between the IML tools 320 and disposed in the OML tool 352. During the application of the internal compaction pressure, the composite article 200 may be heated to a predetermined temperature for a predetermined period of time to allow for curing of the composite components of the composite article 200 into a unitized, monolithic composite structure. By way of example, composite materials used in the aerospace industry are commonly heated to a temperature range between 30 degrees centigrade and 200 degrees centigrade and are subjected to pressures between 15 and 100 psi.

The operations shown in FIGS. 4A-4K are described herein and may be executed in a method of manufacturing a composite article that includes a composite failsafe torque tube. In general, such a method includes forming a composite failsafe torque tube between an upper skin and a lower skin of an uncured composite flap structure in a outer mold line (OML) mold that includes an upper mold and a lower mold, wherein the composite failsafe torque tube is initially formed with an uncured composite outer tube. Such a method may also include co-curing the uncured outer tube and the uncured composite flap structure.

For example, as depicted in FIG. 4A, the lower mold 356 of an OML mold is provided. As depicted in FIG. 4B-4D, an IML tool 320 may include one or more of a forward bag carrier 321, a mid bag carrier 323 and an aft bag carrier 325 which may be positioned on the lower mold 356. As shown in FIGS. 4E-4F, a composite failsafe torque tube 205 may be positioned between the forward bag carrier 321 and the aft bag carrier 325. Thus, when the upper skin 201 of the composite flap is added, the failsafe torque tube 205 may be disposed between upper skin 201 and lower skin 203 (not visible in FIG. 4F).

As shown in FIG. 4G, an upper mold 357 may be positioned as described for the OML tool of FIG. 3. As shown in FIG. 4H-4J, IML tool 320 may include a forward bag 421 disposed around forward bag carrier 321 (not visible in FIG. 4G) and an aft bag 425 disposed around aft bag carrier 325. The IML tool 320 may also include a mid bag 411 which may extend from outside of the mid bag carrier 323, such as at 428, through an inside volume of the torque tube 211, such as at 426, particularly if the torque tube is shorter than the co-cured article as indicated in FIG. 4J. In other words, the mid bag may extend through a hollow inner volume portion of the failsafe torque tube 211, thereby providing support the uncured outer composite tube 211 before, during and after curing. While in some examples, an IML tool 320 may include a vacuum system comprising a separate bag carrier 323 as described for FIG. 4J, the examples are not so limited. Thus, in an example, the inner tube may be used as a bag carrier around which the outer tube may be formed. In other words, the inner tube of the composite failsafe torque tube may be used as a bag carrier during a curing process (not shown). The upper layer, lower layer and failsafe composite torque tube may be co-cured in the mold, removed from the mold and may form a composite flap 200', as shown in FIG. 4K. For example, the failsafe torque tube may be formed by wrapping plies of a composite around the inner tube or around a bag disposed around a bag carrier to form an uncured outer tube, which may then be co-cured in the OML tool along with other composite structural components of the composite article.

Figure 5:
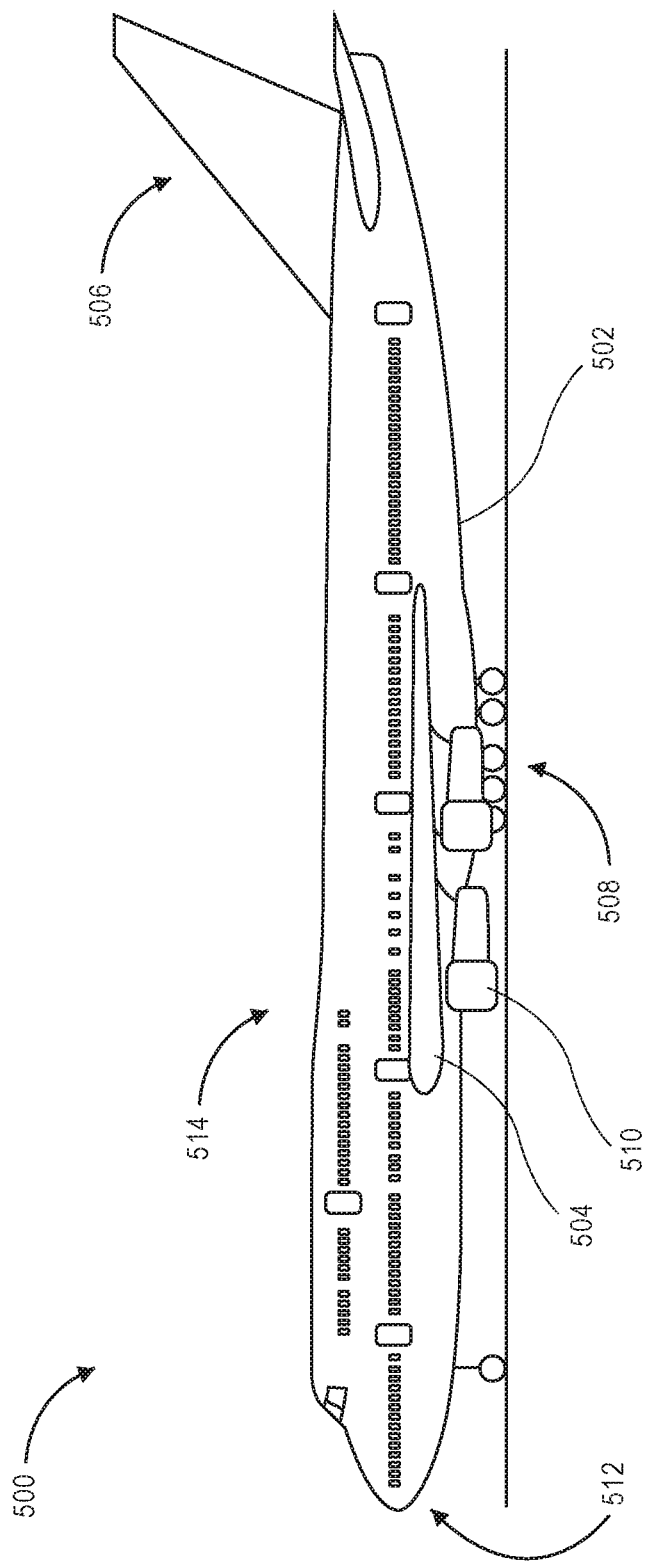
FIG. 5 is a schematic illustration of an aircraft, according to an example.

FIG. 5 is a side elevation view of an aircraft 500 having one or more composite parts such as composite article 200 in accordance with another example of the disclosure. One of ordinary skill in the art will appreciate that composite parts may be employed in a wide variety of locations, including the fuselage, wings, empennage, body, and walls of the aircraft 500. In alternate examples, composite parts may be used on other types of structures, vehicles, and platforms, such as motor vehicles, aircraft, maritime vessels, or spacecraft, or other suitable applications.

In this example, the aircraft 500 includes a fuselage 502 including wing assemblies 504, a tail assembly 506, and a landing assembly 508. The aircraft 500 further includes one or more propulsion units 510, a control system 512 (not visible), and a host of other systems and subsystems that enable proper operation of the aircraft 500. A composite article that includes a composite failsafe torque tube may be employed in any suitable portion of the aircraft 500, such as in wing assemblies 504, tail assembly 506, and any other suitable areas of the aircraft 500. In general, the various components and subsystems of the aircraft 500 may be of known construction and, for the sake of brevity, will not be described in detail herein.

Although the aircraft 500 shown in FIG. 5 is generally representative of a commercial passenger aircraft, including, for example, the 737, 747, 757, 767, 777, and 787 models commercially available from The Boeing Company of Chicago, Ill., the inventive composite article and methods disclosed herein may also be employed in the assembly of virtually any other types of aircraft. More specifically, the teachings of the present disclosure may be applied to the manufacture and assembly of other passenger aircraft, fighter aircraft, cargo aircraft, rotary aircraft, and any other types of manned or unmanned air vehicle.

Figure 6:
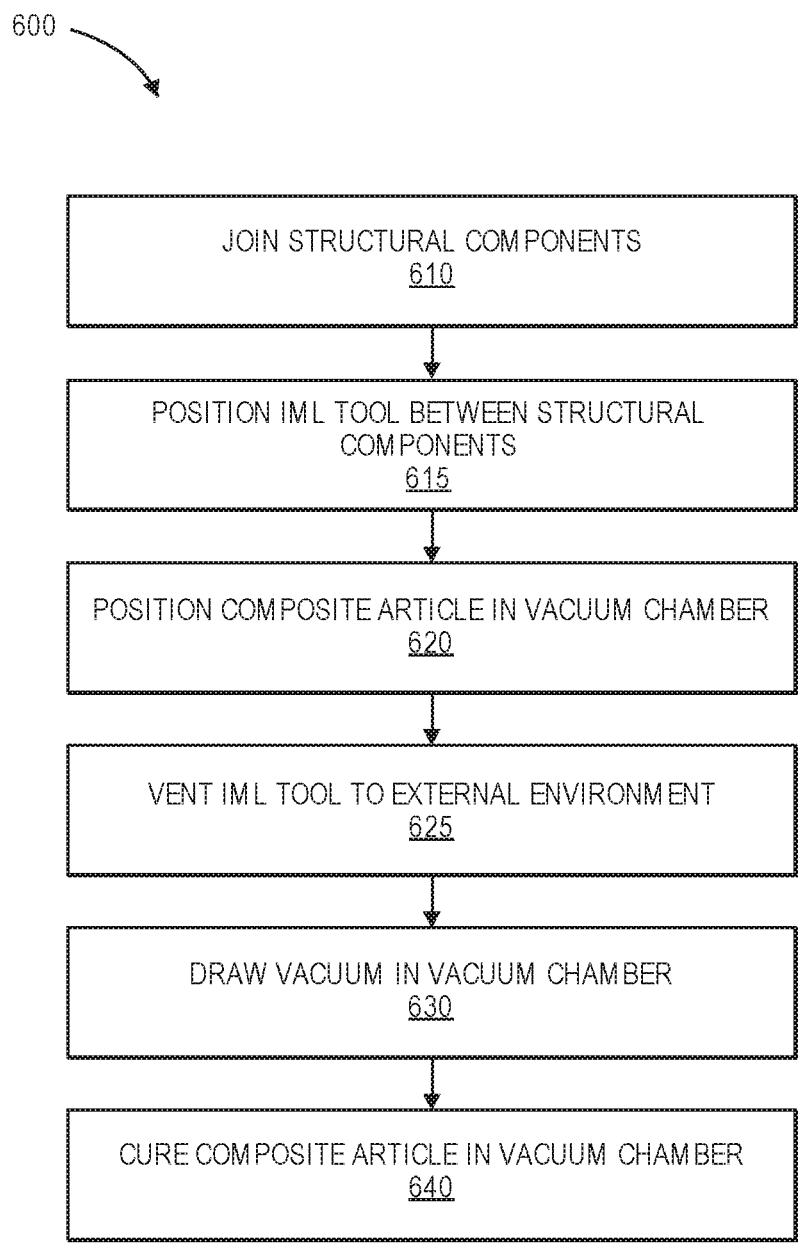
FIG. 6 is a flow chart illustrating operations in a method to manufacture a composite article that includes a composite failsafe torque tube.

Referring to the flow diagram of FIG. 6, with additional reference to the tooling system 350 of FIG. 3 and the operations shown in FIGS. 4A-4K as described above, a method 600 may be utilized for forming a composite article 200 such as a composite flap that includes a composite failsafe torque tube 205. Generally, structural components such as upper skin 201 and lower skin 202, and one or more spars 204, 208, 210 are joined at 610, for example, to define a shape such as the shape illustrated in FIGS. 2A-2D. Accordingly, structural components such as an upper skin 201 defines a first surface, a lower skin 203 defines a second surface, spars 204, 208 and 210 define structural components for supporting the upper and lower skins. An inner tube 209 may also support an outer composite tube 211 to form a composite failsafe torque tube 205 which may also provide support to upper skin 201 and lower skin 201 as shown in FIG. 2C-2D. An adhesive resin may be applied to these various components or they may be secured with clamps.

At operation 615, one or more IML tool may be positioned between some or all the structural components. The one or more IML tool may include a single vacuum bag configured in a shape with portions that extends between the some or all of the structural components or may include several vacuum bags that individually extend between the some or all of the structural components. The vacuum bag may be expandable to form to the surfaces of the various structural components. The vacuum bag may further comprise a vent which allows the vacuum bag to be vented to an external environment. In some examples at least one bag carrier may be positioned in the vacuum bag. One example, the bag carrier may be positioned in the vacuum bag.

At operation 620, the composite part 200 is positioned in a vacuum chamber. By way of example, in some examples, the vacuum chamber may be embodied as a second vacuum bag which is sufficiently large to hold the entire assembly of structural components. The vacuum chamber may further comprise an integrated vacuum bag. Thus the vacuum chamber may include one continuous bag system with an inner and an outer bag.

At operation 625 the one or more or all IML, tool bags are vented to an external environment. By way of example, in some examples, the vent of the vacuum bags may be placed in fluid communication with the ambient environment, e.g., by coupling a tube to the vent and extending the tube to the ambient environment.

At operation 630, a vacuum is drawn in the vacuum chamber. As used herein the term vacuum should be construed to mean that the ambient pressure of the gas in the vacuum chamber is reduced to a level below the air pressure of the ambient environment. As used here, the term vacuum should not be construed to require the forming of a perfect vacuum in the vacuum chamber. A vacuum may be drawn by drawing the gas from the vacuum chamber using a pump or the like.

In an example, all the IML tool vacuum bags are vented to the ambient environment, the IML tool vacuum bag will expand to occupy the space defined between the some or all the structural components. The expansion of, for example, the vacuum bag around the bag carrier(s) applies a uniform cure pressure against one or more of the sides or surfaces of the structural components, thereby reducing the risk of ply distortion and voids in the layers of the composite structures.

At operation 640, the composite part is cured in the vacuum chamber. In some examples, curing the composite part may comprise heating the composite part to a temperature at which the resin and/or any adhesive used to form the composite part will cure. In addition the composite part may be subjected to pressure. The specific temperature and pressure applied to the composite part may be a function of the materials from which the composite part is constructed. As described above, by way of example, composite materials used in the aerospace industry are commonly heated to a temperature range between 30 degrees centigrade and 200 degrees centigrade and are subjected to pressures between 15 and 100 psi.

In an example, all of the IML, tools may be removed from the cured composite part to provide a cured composite part, including a composite aerodynamic flap for an air vehicle that includes an integrated failsafe composite torque tube. In an example, the inner tube may be provided instead of or in addition to an IML tool to support the outer composite tube before, during and after curing.

While the examples have been illustrated respect to one or more implementations, alterations and/or modifications can be made to the illustrated examples without departing from the spirit and scope of the appended claims. In addition, while a particular feature of the examples may have been disclosed with respect to only one of several implementations, such feature may be combined with one or more other features of the other implementations as may be desired and advantageous for any given or particular function.

Furthermore, to the extent that the terms "including", "includes", "having", "has", "with", or variants thereof are used in either the detailed description and the claims, such terms are intended to be inclusive in a manner similar to the term "comprising." As used herein, the phrase "one or more of", for example, A, B, and C means any of the following: either A, B, or C alone; or combinations of two, such as A and B, B and C, and A and C; or combinations of three A, B and C.

Other examples will be apparent to those skilled in the art from consideration of the specification and practice of the descriptions disclosed herein. It is intended that the specification and examples be considered as exemplary only, with a true scope and spirit of the examples being indicated by the following claims.

What is claimed is:

1. A method for forming a composite air vehicle control surface, the method comprising:
    positioning a forward bag carrier on a lower mold;
    positioning a mid bag carrier on the lower mold;
    positioning an aft bag carrier on the lower mold, wherein the mid bag carrier is positioned at least partially between the forward bag carrier and the aft bag carrier;
    positioning a failsafe torque tube on the lower mold, wherein the failsafe torque tube is positioned at least partially between the forward bag carrier and the aft bag carrier, wherein the failsafe torque tube comprises an inner tube and an outer tube;
    adding an upper skin at least partially over the mid bag carrier, the aft bag carrier, and the failsafe torque tube;
    adding a lower skin at least partially under the mid bag carrier, the aft bag carrier, and the failsafe torque tube, wherein the outer tube, the upper skin, and the lower skin are made of a composite material;
    positioning an upper mold at least partially over the composite upper skin;
    positioning a forward bag at least partially around the forward bag carrier;
    positioning an aft bag at least partially around the aft bag carrier; and
    co-curing the outer tube, the upper skin, and the lower skin together to produce an integral, monolithic, composite article, wherein the composite article comprises the composite air vehicle control surface, wherein the lower mold at least partially defines a surface of the lower skin, and wherein the upper mold at least partially defines a surface of the upper skin.

2. The method of claim 1, wherein the lower mold comprise a sloped surface and a ramp positioned proximate to a lower end of the sloped surface.

3. The method of claim 2, wherein the forward bag carrier is positioned proximate to the ramp.

4. The method of claim 3, wherein the forward bag carrier comprises a first concave surface portion that faces away from the ramp, and wherein the mid bag carrier comprises a convex surface portion that contacts the first concave surface portion.

5. The method of claim 4, wherein the aft bag carrier comprises a second concave surface portion that faces toward the ramp, and wherein the mid bag carrier is positioned between and contacts the first and second concave surface portions.

6. The method of claim 1, wherein the failsafe torque tube is positioned at least partially between the upper skin and the lower skin and axially adjacent to the mid bag carrier.

7. The method of claim 1, further comprising positioning a mid bag such that the mid bag extends from outside of the mid bag carrier at least partially through a hollow inner volume portion of the failsafe torque tube.

8. The method of claim 7, wherein the mid bag provides support for the outer tube before, during, and after curing of the outer tube.

9. The method of claim 1, further comprising wrapping plies of the composite material around the inner tube to produce the outer tube, wherein the inner tube serves as a mold to form the outer tube, and wherein the inner tube is not removed from the outer tube after the outer tube is produced.

10. The method of claim 9, wherein the inner tube is made of a metallic material.

* * * * *